(12) United States Patent
Delbru

(10) Patent No.: US 11,782,924 B2
(45) Date of Patent: Oct. 10, 2023

(54) DISTRIBUTED JOIN INDEX FOR SHARED-NOTHING AND LOG-STRUCTURED DATABASES

(71) Applicant: SINDICE LIMITED, Galway (IE)

(72) Inventor: Renaud Delbru, Gradignan (FR)

(73) Assignee: SINDICE LIMITED, Galway (IE)

( * ) Notice: Subject to any disclaimer, the term of this patent is extended or adjusted under 35 U.S.C. 154(b) by 72 days.

(21) Appl. No.: 17/286,609

(22) PCT Filed: Oct. 18, 2019

(86) PCT No.: PCT/EP2019/078459
§ 371 (c)(1),
(2) Date: Apr. 19, 2021

(87) PCT Pub. No.: WO2020/079271
PCT Pub. Date: Apr. 23, 2020

(65) Prior Publication Data
US 2021/0374138 A1    Dec. 2, 2021

(30) Foreign Application Priority Data
Oct. 18, 2018 (IE) .................................. S2018/0326

(51) Int. Cl.
G06F 16/2453 (2019.01)
G06F 16/22 (2019.01)
G06F 16/27 (2019.01)

(52) U.S. Cl.
CPC .... G06F 16/24544 (2019.01); G06F 16/2272 (2019.01); G06F 16/278 (2019.01)

(58) Field of Classification Search
CPC ........... G06F 16/2272; G06F 16/24544; G06F 16/2456; G06F 16/278
See application file for complete search history.

(56) References Cited

U.S. PATENT DOCUMENTS 5,983,215 A * 11/1999 Ross .................... G06F 16/2456
707/972
6,061,676 A * 5/2000 Srivastava ........ G06F 16/24537
707/999.005
(Continued)

FOREIGN PATENT DOCUMENTS

WO    WO-03098465 A1 * 11/2003 ......... G06F 16/2264

OTHER PUBLICATIONS

Perrizo, Ram and Wenberg, "Distributed join processing performance evaluation," 1994 Proceedings of the Twenty-Seventh Hawaii International Conference on System Sciences, 1994, pp. 236-245, doi: 10.1109/HICSS.1994.323260. (Year: 1994).*
(Continued)

*Primary Examiner* — James E Richardson
(74) *Attorney, Agent, or Firm* — Workman Nydegger

(57) ABSTRACT

A method and computer program for optimizing computation and data retrieval of join operations from a multi-node log-structure database system. The database system has one or more data tables each having a plurality of columns. A join index is created for one or more join key columns, with optionally one or more secondary columns, of one of the data tables. The join index is partitioned across at least one computing node, and each join index partition reproduces the log structure storage of the data table. The join index is maintained in a series of incremental operations by replicating the creation or deletion of data segments from the log structure storage of the data table to the join index partitions.

24 Claims, 8 Drawing Sheets

(56) References Cited

U.S. PATENT DOCUMENTS

| | | | |
|---|---|---|---|
| 6,112,198 A * | 8/2000 | Lohman | G06F 16/24532 |
| 6,167,399 A * | 12/2000 | Hoang | G06F 16/2456 |
| | | | 707/999.005 |
| 6,438,562 B1 * | 8/2002 | Gupta | G06F 16/2272 |
| | | | 707/696 |
| 6,505,188 B1 * | 1/2003 | Ghazal | G06F 16/24561 |
| | | | 707/999.002 |
| 6,505,189 B1 * | 1/2003 | On Au | G06F 16/24561 |
| 6,609,131 B1 * | 8/2003 | Zait | G06F 9/5066 |
| | | | 707/999.102 |
| 6,618,720 B1 * | 9/2003 | On Au | G06F 16/2456 |
| | | | 707/999.005 |
| 6,745,198 B1 * | 6/2004 | Luo | G06F 16/2456 |
| | | | 707/999.102 |
| 7,418,544 B2 * | 8/2008 | Mukherjee | G06F 3/0659 |
| | | | 711/111 |
| 8,032,503 B2 * | 10/2011 | Bouloy | G06F 16/2228 |
| | | | 707/696 |
| 8,990,186 B2 * | 3/2015 | Ma | G06F 16/2456 |
| | | | 707/714 |
| 9,672,235 B2 * | 6/2017 | Schreter | G06F 16/2272 |
| 2014/0279855 A1 * | 9/2014 | Tan | G06F 16/2282 |
| | | | 707/609 |

OTHER PUBLICATIONS

Jaqueline J. Brito et al., "Random access with a distributed Bitmap Join Index for Star Joins", Heliyon, vol. 6, Issue 2, 2020, e03342, ISSN 2405-8440, https://doi.org/10.1016/j.heliyon.2020.e03342. (Year: 2020).*

International Preliminary Report on Patentability received for PCT Patent Application No. PCT/EP2019/078459, dated Apr. 29, 2021, 11 pages.

Grace Au et al. "Introduction to Materialized Views in Teradata", Oct. 25, 2002. http://www.tensupport.com/library/materialview.pdf.

Teradata Labs "Introduction to Teradata" Dec. 14, 2016. http://assets.teradata.com/pdf/TCPP/databeise/lntro to Teradata 16 00.pdf Chapter 5 (pp. 35-39) Chapter 7(pp. 49-60) and Chapter 11 (pp. 85-96).

International Search Report issued in International Application No. PCT/EP2019/078459 dated Dec. 3, 2019.

Written Opinion of the ISA issued in International Application No. PCT/EP2019/078459 dated Dec. 3, 2019.

* cited by examiner

DISTRIBUTED JOIN INDEX FOR SHARED-NOTHING AND LOG-STRUCTURED DATABASES

The present application is a U.S. National Stage of International Application No. PCT/EP2019/078459, filed on Oct. 18, 2019, designating the United States and claiming the priority of Irish Patent Application No. S2018/0326 filed with the Irish Patent Office on Oct. 18, 2018. All of the aforementioned applications are incorporated herein in their respective entireties by this reference.

FIELD OF THE INVENTION

The present disclosure relates to the field of databases and, in particular, join indices.

BACKGROUND OF THE DISCLOSURE

A join index [Patrick Valduriez, Join Indices, ACM TODS, Vol. 12, No. 2, June 1987, Pages 218-246] is a well known technique in the database domain, which is used to improve the performance of join operations. A join index is a special form of materialized view that represents a data table obtained after joining multiple data tables. Compared to a single-table index which maps column values to rows in a single table, a join index maps column values from multiple tables to the materialized rows of these tables.

Existing techniques for building and maintaining a join index have multiple limitations:
  The maintenance cost of a join index can be quite high. Every row that has been modified by an insert, update, or delete must be verified; that is, a join involving these rows must be recomputed.
  A join index is specifically built for a given join condition and cannot be used for another join condition. This increases the storage and maintenance costs even more. For example, if a join index is created for the relation Nation.NationKey=Supplier.NationKey, then it cannot be reused for the relation Nation.NationKey=Customer.NationKey; another join index must be created specifically for that relation.
  The consistency of the record identifiers between the join index and the original data tables is primordial to ensure their interoperability. However, such a record identifier must be carefully defined in a shared-nothing distributed database architecture to avoid collision and to minimize the impact on the storage and the performance.

Log-structured database architecture [O'Neil, Patrick, et al. "The log-structured merge-tree (LSM-tree)." Acta Informatica 33.4 (1996): 351-385] uses an append-only strategy to achieve low write latency and high scalability. The append-only update strategy, including no in-place update, and the structural difference from more traditional architectures (for example, B-tree) introduce new problems in index maintenance.

In view of the above-described technologies, there is therefore a need for a method which addresses at least the problems outlined above.

U.S. Pat. No. 6,167,399 relates to a method for creating and querying a join index from multiple tables. It also includes a data structure to optimize storage of repeated parts of multiple rows. This work does not take into consideration log-structured databases, and does not tackle the problem of join index maintenance.

U.S. Pat. No. 6,505,189 relates to a method for creating and querying an aggregate join index. The aggregate join index is an extension of U.S. Pat. No. 6,167,399 to handle aggregation expressions.

U.S. Pat. No. 6,505,188 relates to a technique for generating secondary indices from a virtual (temporary) join index. This work is an extension of U.S. Pat. No. 6,167,399 and does not consider log-structured databases and the problem of index maintenance.

U.S. Pat. No. 8,990,186 relates to a technique to incrementally maintain a join index. This technique is restricted to a data table with a timestamp column in a traditional database architecture, and does not consider the log-structured architecture.

U.S. Pat. No. 6,618,720 relates to a method to optimize the update operations of a plurality of join indices, where each common join is materialized only once in a common spool file. This work is an extension of U.S. Pat. No. 6,167,399 and does not consider log-structured databases.

U.S. Pat. No. 7,418,544 relates to a method for updating a log-structured relational database. This work focuses on strategies to update records in a log-structured database. It does not consider the problem of updating the join index and the consistency of internal record identifiers across tables.

U.S. Pat. No. 9,672,235 relates to a method for partitioning a database index in a manner that is related to a log-structured database. This work does not consider the replication of the database index in secondary indices (for example, join index) and the problem of their maintenance.

US Published Patent Application No. US2014279855A1 introduces different strategies for maintenance of a distributed index in log-structured databases. It does not take into account the internal record identifier and therefore the problem of maintaining consistency of such identifiers between the data table and the index.

U.S. Pat. No. 6,112,198 relates to a technique for performing partition analysis to optimize parallel query execution in a shared-nothing architecture. This work does not consider the replication and the maintenance of a database index.

U.S. Pat. No. 6,609,131 relates to techniques for expanding the concept of data partitioning and leveraging them during parallel join computation. This work does not consider the replication and the maintenance of a database index.

U.S. Pat. No. 6,438,562 relates to a method for maintenance of a global index. This work does not consider the problem involved with log-structured databases.

SUMMARY OF THE INVENTION

A method to build, maintain and query a join index that tackles the limitations described above is presented here. The method is also fault-tolerant as the join index may be replicated across multiple nodes. The method may also be extended to further scenarios, such as computing a filter operation, an aggregate operation and table statistics.

Disclosed are methods and programs to build, maintain and query one or more join indices so that the performance of distributed join operations in a shared-nothing and log-structured database architecture is improved.

A join index is built by repartitioning the data table across multiple computing nodes, thus avoiding dynamic data repartitioning when evaluating the distributed join operation.

A join index is built by replicating the data segments of the log-structured database, so that the incremental maintenance of the join index is facilitated.

The maintenance of the join index is performed by replicating and repartitioning new data segments from the original table. The record identifier that is relative to a data segment is preserved during the creation and maintenance, so that interoperability between the internal record identifiers of the original data table and of the join index is preserved. The distributed join operation may use such internal record identifiers in order to reduce data communication between the computing nodes and to optimize the efficiency of the join computation.

The join index may build, maintain and use a dictionary of join key values across multiple data tables so that join execution strategies with higher efficiency are achieved.

Accordingly, there is provided a method for optimizing computation and data retrieval of join operations from a multi-node log-structure database system, the database system comprising one or more data tables each having a plurality of columns, the method comprising the steps of:
  creating and partitioning a join index across at least one computing node for one or more join key columns, with optionally one or more secondary columns, of one data table wherein each join index partition reproduces the log structure storage of the data table; and
  maintaining the join index in a series of incremental operations by replicating the creation or deletion of data segments from the log structure storage of the data table to the join index partitions.

In preferred embodiments, creating and partitioning the join index comprises:
  scanning and partitioning the records from one or more data table partitions into one or more join index partitions using a partition strategy;
  storing a join index partition as:
    a data partition index which maps a data partition identifier to one or more segment identifiers;
    a segment index which maps a segment identifier to one or more segment files; and
    a plurality of segment files which encode the records with relative identifiers, wherein the relative identifier for a record in a segment file of the join index is the same as the relative identifier for the corresponding record in a corresponding segment file of the data table partition from which the record originated; and
  maintaining a mapping of the data table partitions and data table segments between a data table and a join index partition containing records from said data table.

Preferably, the relative identifier for a record in a segment file is an identifier of the position of the record relative to other records in said segment file.

Preferably, creating and partitioning the join index comprises:
  maintaining a dictionary mapping the values of join key columns to ordinal values;
  sharing said dictionary across a plurality of join index partitions; and
  assigning values of join key columns to an existing ordinal value if already present in the dictionary or to a new shared ordinal value if not already present in the dictionary.

Preferably, maintaining the join index comprises:
  computing the differences between a collection of data segments in a join index and a collection of data segments in a data table;
  replicating a data segment into the join index table upon identifying from said differences a new data segment in the data table; and
  deleting a data segment from the join index upon identifying from said differences a deleted data segment in the data table.

Preferably, maintaining the join index further comprises:
  replicating into the join index a list of stale records of a data segment upon identifying said stale record from said differences.

The method may further comprise computing a join operation by the steps of:
  receiving a query whose output is a join operation employing a join key column of said join index;
  identifying in the data tables a plurality of records that satisfy a portion of the query from the data tables;
  partitioning said records according to the partitioning of the join index partitions;
  transferring the partitioned records to their respective join index partitions;
  computing internal record identifiers that satisfy the join condition using the transferred records and the corresponding join index partitions; and
  constructing a result set.

In cases where the join operation is a semi-join operation, the step of constructing a result set may comprise computing a final set of internal record identifiers on the data table partition using the transferred record identifiers and a remaining portion of filter predicates.

Preferably, a data segment and record identifiers within said data segment of said data table are reproduced immutably in a corresponding data segment of a join index partition.

Preferably, said method is carried out on a first data table to create a first join index with first join index partitions, and said method is further carried out on a second data table to create a second join index with second join index partitions.

In such cases the method may further comprise joining said first and second data tables by accessing the first and second join index partitions, wherein the interoperability between the join index partitions and the corresponding data tables is preserved by the immutability of the data segments and consistency of record identifiers in a data segment across the data table and the join index partitions.

There is also provided a computer program product comprising instructions which, when executed in a processor associated with a multi-node log-structure database system, are effective to cause said processor to carry out the steps of the above methods.

In another aspect there is provided a method for optimizing computation and data retrieval of join operations from a multi-node log-structure database system, the database system comprising one or more data tables each having a plurality of columns, the method comprising the steps of:
  creating and partitioning a first join index for a first of said data tables across at least one computing node for one or more join key columns, with optionally one or more secondary columns, of said first data table, wherein each first join index partition reproduces the log structure storage of the first data table, and wherein a data segment and record identifiers within said data segment of the first data table are reproduced immutably in a corresponding data segment of a first join index partition;
  creating and partitioning a second join index for a second of said data tables across at least one computing node for one or more join key columns, with optionally one or more secondary columns, of said second data table wherein each second join index partition reproduces the log structure storage of the second data table, and wherein a data segment and record identifiers within said data segment of the second data table are reproduced immutably in a corresponding data segment of a second join index partition; and joining said first and second data tables by accessing the first and second join index partitions, wherein the interoperability between the join index partitions and the corresponding data tables is preserved by the immutability of the data segments and consistency of record identifiers in a data segment across the data table and the join index partitions.

Preferably, creating and partitioning each join index comprises:

scanning and partitioning the records from one or more data table partitions into one or more join index partitions using a partition strategy;

storing a join index partition as:
  a data partition index which maps a data partition identifier to one or more segment identifiers;
  a segment index which maps a segment identifier to one or more segment files; and
  a plurality of segment files which encode the records with relative identifiers, wherein the relative identifier for a record in a segment file of the join index is the same as the relative identifier for the corresponding record in a corresponding segment file of the data table partition from which the record originated; and maintaining a mapping of the data table partitions and data table segments between a data table and a join index partition containing records from said data table.

Preferably, the relative identifier for a record in a segment file is an identifier of the position of the record relative to other records in said segment file.

Preferably, creating and partitioning each join index comprises:

maintaining a dictionary mapping the values of join key columns to ordinal values;

sharing said dictionary across a plurality of join index partitions; and assigning values of join key columns to an existing ordinal value if already present in the dictionary or to a new shared ordinal value if not already present in the dictionary.

Preferably this method further comprises:

maintaining the join index in a series of incremental operations by replicating the creation or deletion of data segments from the log structure storage of the data table to the join index partitions.

Preferably, maintaining each join index comprises:

computing the differences between a collection of data segments in said join index and a collection of data segments in its corresponding data table;

replicating a data segment into the join index table upon identifying from said differences a new data segment in the data table; and deleting a data segment from the join index upon identifying from said differences a deleted data segment in the data table.

Preferably, maintaining the join index further comprises:

replicating into the join index a list of stale records of a data segment upon identifying said stale record from said differences.

There is further provided a computer program product comprising instructions which, when executed in a processor associated with a multi-node log-structure database system, are effective to cause said processor to carry out the steps of the method of this aspect of the invention.

Disclosed also is a method for optimizing computation and data retrieval of join operations from a multi-node database system, comprising:

Creating and partitioning a join index across at least one computing node for one or more join key columns, with optionally one or more secondary columns of one or more data tables;

Storing at least one join index partition on at least one computing node;

Performing operations to compute joins between data tables using the corresponding join indices on at least one computing node; and Devising maintenance mechanisms of the join indices as an incremental maintenance.

In one aspect the creation of the join index partition includes:

Scanning and partitioning the records from one or more data table partitions into one or more join index partitions using a partition strategy;

Storing a join index partition into a data partition index, a segment index, and one or more segment files;

Maintaining a mapping of the data table partitions and data table segments between the data table and a join index partition;

Preserving interoperability and consistency between the internal record identifiers of the data table and a join index partition; and Maintaining a dictionary of values from at least one join key column to ordinal values;

Comprising logic for sharing ordinal values between one or more join index partitions.

In another aspect the performed operations for the computation of a join operation include:

Processing a query and deciding to evaluate a portion of the query on both the data tables and the join indices, or directly using the join indices;

Collecting and partitioning records that satisfy a portion of the query from the data tables before transferring them to their respective join index partitions; and Computing internal record identifiers that satisfy the join condition using the transferred records and the corresponding join index partitions;

Comprising logic to evaluate the join operation using various strategies such as a nested loop, hash or sort-merge join;

Comprising logic for optimizing join computation by leveraging the shared dictionary which provides a mapping between the join key values and the ordinal values; and Collecting internal record identifiers satisfying the join condition and constructing the final result set.

In another aspect the performed operations for the computation of a semi-join operation include:

Processing a query and deciding to evaluate a portion of the query on both the data tables and the join indices or directly using the join indices;

Collecting and partitioning internal record identifiers satisfying a portion of the query from the data tables before transferring them to their respective join index partitions; and Computing internal record identifiers satisfying the join condition using the transferred record identifiers and the corresponding join index partitions;

Comprising logic to evaluate the semi-join operation using various strategies such as a nested loop, hash or sort-merge join;

Comprising logic for optimizing join computation by leveraging the shared dictionary which provides a mapping between the join key values and the ordinal values; and Collecting internal record identifiers satisfying the join condition and transferring them to their respective data table partition and data table segment.

Computing the final set of internal record identifiers on the data table partition using the transferred record identifiers and the remaining filter predicates;

Collecting the internal record identifiers and constructing the final result set.

In another aspect the incremental maintenance of a join index includes:

Logic to compute the differences between a collection of data segments in a join index and a collection of data segments in a data table;

Replicating a data segment into the join index table upon creation of a new data segment in the data table;

Replicating a list of stale records of a data segment from a data table into a data segment of a join index;

Deleting a data segment in the join index upon deletion of a data segment in the data table; and Replicating the creation or deletion of data segments into the join index upon compaction of data segments in the data table.

In another aspect, the method comprises logic for fault tolerance of the join index table by replicating the join index partitions on one or more computing nodes.

These and other features will be better understood with reference to the following figures which are provided to assist in an understanding of the present teaching, by way of example only.

DETAILED DESCRIPTION

Figure 1:
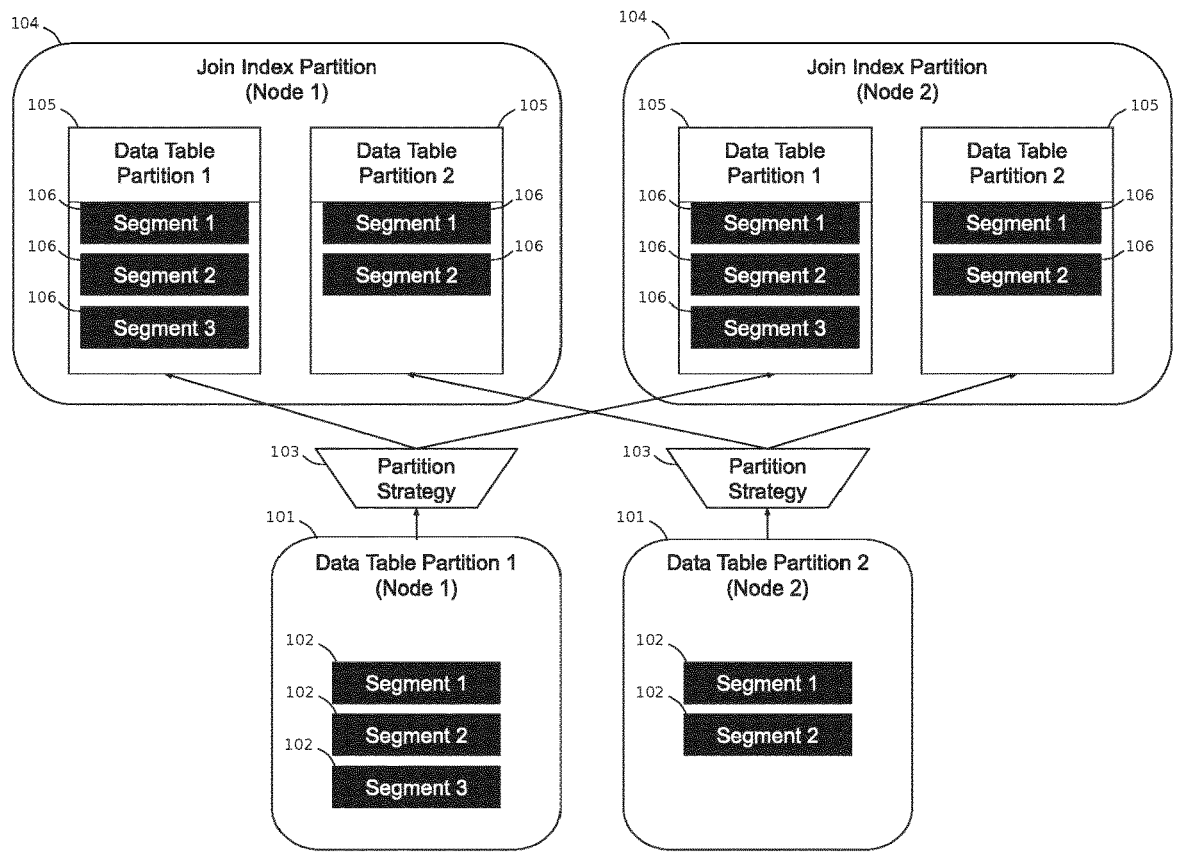
FIG. 1 illustrates how a join index partition is replicating a log structure of a data table, according to an embodiment of the present disclosure.

Embodiments of the present disclosure will now be described with reference to some exemplary apparatus and systems described herein. It will be understood that the embodiments described are provided to assist in an understanding of the present disclosure and are not to be construed as limiting in any fashion. Furthermore, modules or elements that are described with reference to any one figure may be interchanged with those of other figures or other equivalent elements.

Described in the present disclosure is a distributed database system based on a shared-nothing and log-structured (append-only) architecture which can be key-value stores, document stores, graph stores, or columnar data stores. Many modern databases such as Cassandra [Lakshman, Avinash, and Prashant Malik. "Cassandra: a decentralized structured storage system." ACM SIGOPS Operating Systems Review 44.2 (2010): 35-40], BigTable [Chang, Fay, et al. "Bigtable: A distributed storage system for structured data." ACM Transactions on Computer Systems (TOCS) 26.2 (2008): 4], HBase, and Elasticsearch are based on this type of architecture.

In a shared-nothing distributed database architecture, the database system runs on a cluster of computing nodes in which each computing node is independent from the others. The logical data table is partitioned into one or more data table partitions which are distributed across the nodes. A data table partition may be associated with a unique identifier. Each node can have one or more data table partitions that are themselves independent from each other. A data table partition is uniquely identified.

In a log-structured database, a data table partition is organised as a series of one or more data table segments of increasing size. A data table segment may be associated with a unique identifier. A data table segment is self-contained with its own data store, index, cache, and other data structures that may aid in data processing. Updates are appended to a new data segment instead of being an in-place overwrite in an existing data segment. Stale data are marked as deleted in a segment. A process called "compaction" or "merge" is performed by the system and related to combining one or more segments into a new larger one in order to optimize I/O and remove stale data.

It is considered that each data record is associated with an internal record identifier. This identifier is usually an integer that is incremented for each new record. Such internal record identifiers are keys to high performance due to their incremental nature as they enable efficient sequential scan (access to data in its physical order), fast record lookup (usually without the need of an index since the identifier can be easily mapped to its physical address), efficient compression, and are used in bit array data structures.

Considered also are relations for join operations in a broader sense; that is, a relation can be between a primary key and a foreign key, or between foreign keys, and can also include self-relation.

The join operation in a distributed database system is quite often the most expensive operation in term of I/O, memory, CPU and network costs. When performing a distributed join, the database system needs to scan each data table partition and shuffle the tuples across the nodes of the cluster. The shuffle operation relates to the distribution of the data across one or more nodes. The shuffle operation may be performed using a hash partitioning strategy by hashing the join key to select the node where to send the tuple. The shuffle operation creates partitions where tuples from different data tables might share the same key. Each node can then execute the join operation independently from the others. It is envisaged by the inventors that the techniques of the present disclosure can, however, be extended to other partitioning strategies. These could include, for example, a range or radix partitioning strategy, or one where composite columns may be used as a join key.

However, when the same relation is used frequently in different queries, the database system will have to scan and shuffle the same data over and over again. Instead, it would be more advantageous to store the data partitions on the node and reuse them for other queries. This is the primary objective of a join index.

Join Index

Compared to other join index approaches, the join results are not fully materialised in the join index approach that is disclosed. Instead, each single data table is materialised separately by partitioning them on the join key. The join index for the relation Nation.NationKey=Supplier.NationKey will be composed of two separate join index tables, one for Nation and one for Supplier, both partitioned on the NationKey column. This means that the join still has to be performed but the data locality can be leveraged, which provides a significant performance gain since tuples do not need to be shuffled across the cluster.

Each join index table includes a reference to the global record identifier of the original data table for interoperability with the original data table. For example, when evaluating a query, the coordinator may decide to push the evaluation of the filter predicates down to the original data table (which might provide indices on the filtered columns), then shuffle the record identifiers (in a highly compressed format) to the join index tables for the evaluation of the join operation.

Each join index table can also be optimized by sorting them by their partition key so that the efficient sort-merge join can be leveraged. In addition, since each single join index table is kept separately, this means that the same join index table can be reused for other relations. For example, if the relation Nation.NationKey=Customer.NationKey has to be evaluated, the same join index table Nation that was previously used for the relation Nation.NationKey=Supplier.NationKey can be reused.

Traditional databases may use a similar approach (for example, Teradata uses something similar and calls it a Single Table Join Index). Deletes, inserts, and updates with in-place overwrite are replicated to the join index. However, such operations incur overhead of reading, modifying, and writing data pages of the B-tree, and lead to an increase in the overall latency of any update operations.

Record Identifier

One challenge with the shared-nothing database architecture is that assigning and maintaining a global record identifier across the cluster for every record may be costly and goes against the shared-nothing architecture, as this would require a global coordination across the cluster to identify each single record. In an embodiment, a hash based on the record or a UUID may be used as a global record identifier; however, this means that the advantages described earlier of using an internal, increment-based identifier are lost, which will lead to an increase in I/O, memory, and network costs. In an embodiment, a global increment-based record identifier may be generated by using a data partition identifier and increment-based record identifier that is local to the data partition. This avoids global coordination across the cluster; however, the record identifier must be explicitly stored as a value in the record, which will lead to an increase of storage and I/O costs.

Instead, one can take advantage of the append-only update strategy of the log-structured database to dynamically generate a global record identifier when accessing the record. Given that a data segment in a log-structured database is immutable, we can identify a record based on its physical order of insertion in the data segment. The position of the record in the segment becomes a record identifier that is relative to the segment. A global record identifier can be generated by combining the data partition identifier, the data segment identifier, and the relative record identifier.

However, there is no guarantee on the consistency of such a relative record identifier given that a compaction of data segments will write records in a new data segment and at a new position. Without such consistency, the interoperability between the join index table and the original data table is not maintained. If a B-tree structure is used for the join index, a compaction would lead to very high maintenance cost, since every record from the new data segment has to be updated with their new internal identifier. In order to maintain consistency of record identifiers between the original data table and the join index table, it is necessary for the join index to replicate the log-structured model of the database. With this design, the data partition identifier, the data segment identifier, and the relative record identifier can be compared between the data and the join index tables, and consistency is preserved.

Data Structure

The join index table may be partitioned into one or more join index partitions based on the join key across one or more nodes of the cluster. The join key may be a single column or a combination of columns. FIG. 1 illustrates how a join index may be partitioned across two nodes of the cluster and how it may replicate the log structure of a data table, according to an embodiment of the present disclosure.

Blocks 101 represent two data table partitions, each one stored in a different node of the cluster. Blocks 102 represent the data segments of the data table partitions. The first data table partition comprises three data segments, while the second data table partition comprises two data segments. Block 103 represents the partition strategy that partitions and shuffles the data table partitions 101 to the join index partitions. Blocks 104 represent two join index partitions, each one stored in a different node of the cluster. A join index partition replicates the data table partitions and the segments of the data table. Blocks 105 represent the replicated data table partitions 101. Blocks 106 represent the replicated data segments. Each replicated data segment 106 contains a subset of the records from its corresponding data segment 102, as per the partition strategy 103.

Figure 2:
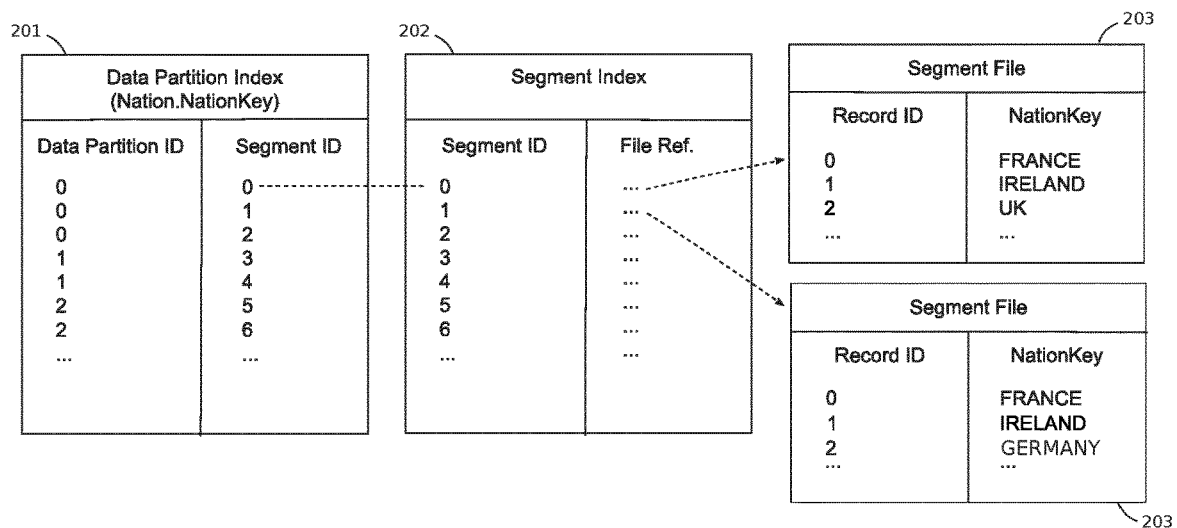
FIG. 2 illustrates the structure of a join index partition, according to an embodiment of the present disclosure.

FIG. 2 illustrates the structure of a join index partition, according to an embodiment of the present disclosure. A join index partition is organised into a structure as depicted in FIG. 2 with:

1. A Data Partition Index 201, which maps a Data Partition ID to a list of Segment IDs;
2. A Segment Index 202, which maps a Segment ID to a Segment File;
3. One or more Segment Files 203, which encodes the records along with their relative identifiers. The record identifiers are illustrated for better comprehension, but those are implicit and can be derived from the position of the record in the segment.

The structure of the data partition index, segment index and segment file may vary from one implementation to another. In an embodiment, an implementation may be based on a row-based encoding. In an embodiment, a columnar approach to encode columns for fast scans may be used instead. In an embodiment, indices can be added on columns for fast lookups.

In an embodiment, the join index table may have a dictionary that maps values from a column to ordinal values across all the data partitions and data segments for better data compression.

Figure 3:
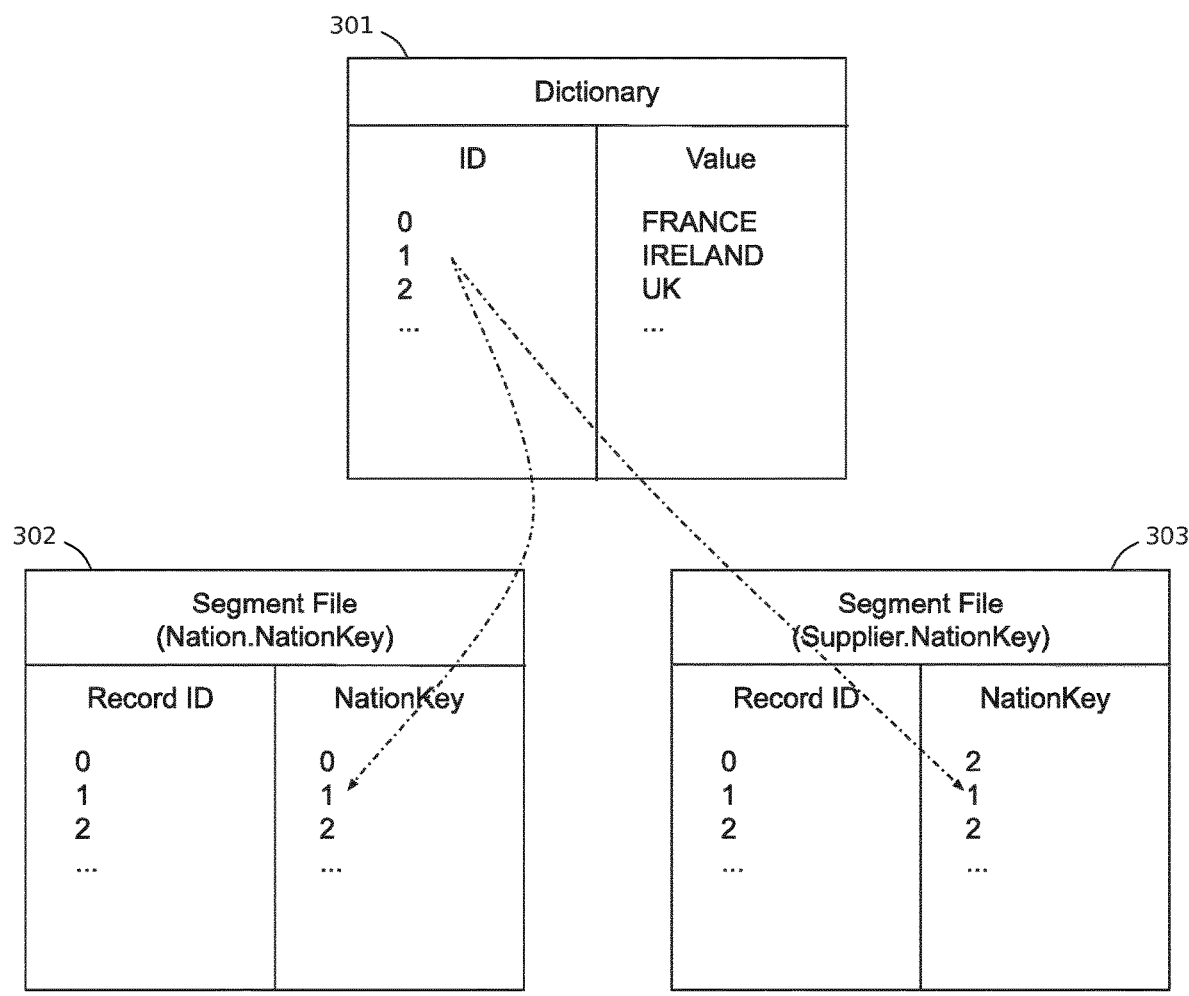
FIG. 3 illustrates a dictionary shared across segments from different join index partitions, according to an embodiment of the present disclosure.

Another method is to have a dictionary that maps values from a join key column across multiple join index tables as depicted in FIG. 3, which shows a dictionary 301 shared across segment files from different join index tables, with one segment file 302 from the join index table Nation.NationKey and one segment file 303 from the join index table Supplier.NationKey. The number of join index tables sharing the same dictionary is not limited. For example, a single dictionary may be used to map the values of the following join key columns: Nation.NationKey, Supplier.NationKey, and Customer.NationKey. This method enables an efficient join strategy that is described in the next section. In an embodiment, the dictionary may be built as explained next. When a new segment is added to the join index partition, the values of the join key column are probed against the dictionary. If the value exists, it is mapped to a shared ordinal value. If the value does not exist, the value is appended to the dictionary and is mapped to a new ordinal value.

Query Processing

The query optimizer of the database system may decide to evaluate a portion of a query on both the original data tables and the join index tables, or directly on the join index tables if they include all the columns that are involved in the query. The first scenario can be taken as an example, as it requires interoperability between the join index and the data tables.

Join

Figure 4:
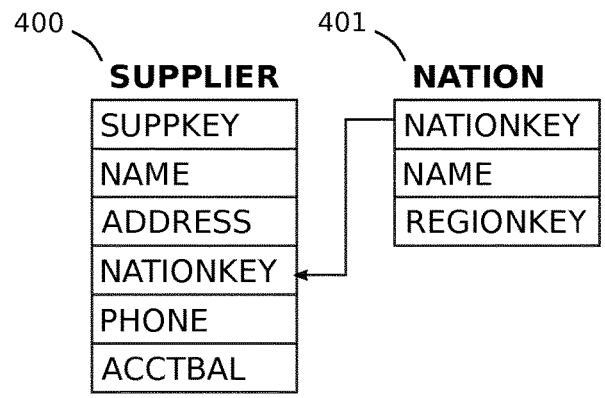
FIG. 4 illustrates the structure of two exemplary database tables related to each other through the attribute NATION-KEY.

FIG. 4 illustrates the structure of two exemplary data tables, Supplier 400 and Nation 401 (a subset of the schema from the Transaction Processing Performance Council's decision support benchmark, TCP-H). In one example with two join index tables, one on Nation.NationKey and one on Supplier.NationKey, it is advantageous to evaluate the following query:

```
SELECT supplier.name, nation.name
FROM supplier, nation
WHERE
    supplier.acctbal > 1000
    AND nation.name in ('IRELAND', 'UK', 'FRANCE')
    AND supplier.nationkey = nation.nationkey
```

Figure 5:
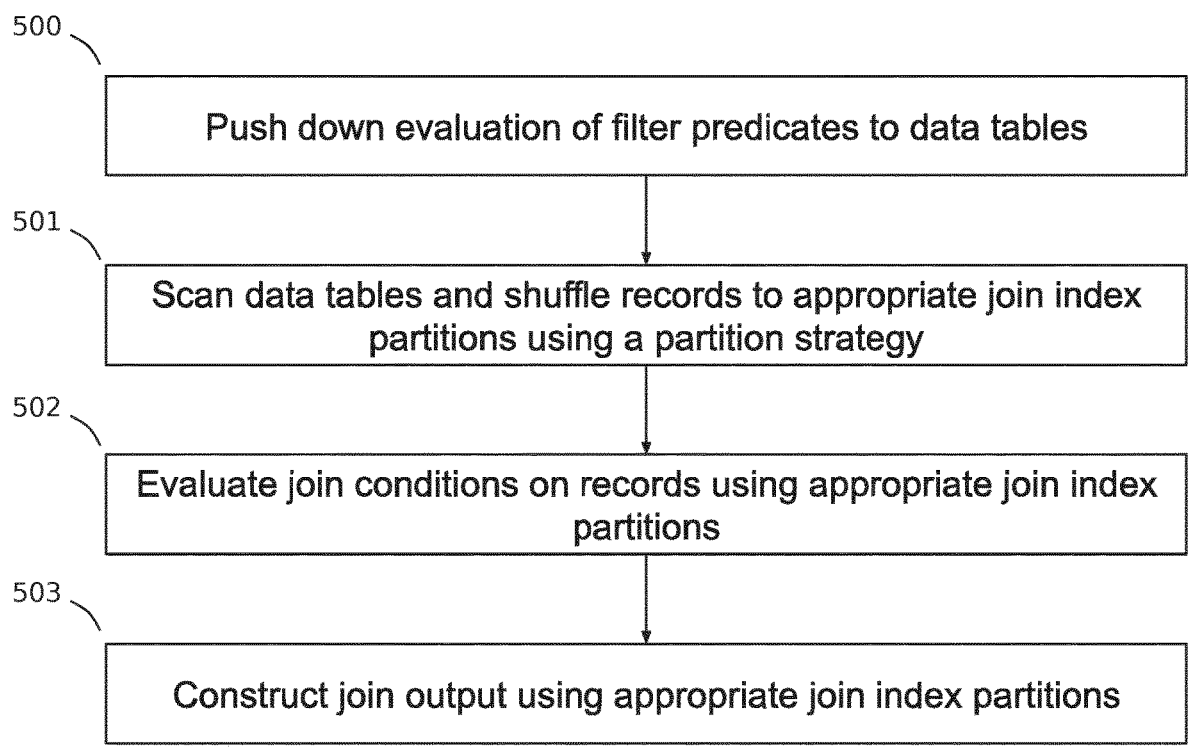
FIG. 5 illustrates a flow chart that describes method steps for computing a join using a join index, according to an embodiment of the present disclosure.

FIG. 5 illustrates a flow chart that describes method steps performed by the database system for computing a join, according to an embodiment of the present disclosure. Step 500 represents the database system pushing down the evaluation of the filter predicates on the Nation and Supplier tables. Step 501 represents the database system shuffling the records from both data tables. Step 502 represents the database system using the two join index tables Nation.NationKey and Supplier.NationKey to evaluate the join. Step 503 represents the database system constructing the final result.

In Step 500, the database system pushes down the execution of the filter predicate "nation.name in ('IRELAND', 'UK', 'FRANCE')" to the Nation data table and of the filter predicate "supplier.acctbal>1000" to the Supplier data table, filtering out the non-matching records.

In Step 501, the database system performs a scan of the Nation data table and of the Supplier data table to collect the records satisfying the predicate filters that were beforehand applied in Step 500. The matching records are shuffled to their appropriate join index partition based on a partition strategy. This may be performed by the database system by processing the data segments of the Nation and Supplier data tables in the following way:

1. For a segment with N records, allocate a join index partition array of size N, denoted by Record[ ], for each join index partition.

2. Scan the matching records in their physical order.

3. For each matching record, compute its join index partition based on a partition strategy.

4. Collect each matching record into the appropriate join index partition array, leaving a null value for records that do not match or do not belong to the partition. The index of the array is implicitly encoding the record identifier relative to the segment.

5. Send the object <Data Partition ID, Data Segment ID, Record[ ]> to its corresponding join index partition. The object is composed of the data partition identifier, the data segment identifier, and the join index partition array.

In an embodiment, the join index partition array may be encoded in a compact data structure to reduce memory and network transfer overhead. For example, it may be encoded in a bit array data structure if only the record identifier relative to the segment is needed.

Step 502 relates to the evaluation of the join operation. Various join strategies may be applicable, for example hash-join or nested-loop join. A hybrid strategy between a nested-loop join and a sort-merge join is described here, assuming that the join indices are ordered by their join key. The complexity comes from the fact that since the join index table is based on a log-structured model, there is no global order of all the records, but instead each segment is locally ordered. This means that each segment from the left join index table (Supplier) has to be compared with each segment of the right join index table (Nation). Each combination may be evaluated independently and therefore may be easily parallelized.

For each combination of segments <S_i, S_j>, the following strategy is used:

1. the <Data Partition ID, Data Segment ID, Record[ ]> objects associated with the segments S_i and S_j are retrieved. These objects are used to (1) filter out records from the segments that are not matching, using the join index partition array Record[ ], and (2) retrieve the values of a matching record to construct the final result.

2. A sort-merge join over the two segments S_i and S_j is performed. Records that were filtered out by the filter predicates are discarded while scanning by using the <Data Partition ID, Data Segment ID, Record[ ]> object. When scanning a segment, the relative record identifier is probed against the join index partition array Record[ ]. This is achieved by a single lookup in the array structure given that the index of the array is implicitly encoding the relative record identifier.

3. For each pair of records, the join predicate is evaluated by:
 a. retrieving the ordinals O_i, O_j of the join key values from their respective segments S_i and S_j;
 b. mapping the ordinals O_i, O_j to their original values V_i, V_j using the dictionary;
 c. applying the join condition on the values V_i, V_j.

4. When the join predicate is satisfied, the records associated with the left and right join index tables are retrieved from their respective <Data Partition ID, Data Segment ID, Record[ ]> objects and the final record is constructed. The retrieval of a record is achieved by a single lookup in the array structure given that the index of the array is implicitly encoding the relative record identifier. In an embodiment, attributes from a record may also be retrieved from the join index table.

As mentioned in the previous section, if a dictionary of join key values across multiple join index tables, in this case Nation.NationKey and Supplier. Nation Key, is built and maps each join key value to a shared ordinal, a very efficient sort-merge join strategy becomes possible. The sort-merge join can directly compare the shared ordinal when evaluating the join condition instead of having to map the ordinals back to their original values.

In Step 503, the database system construct the final join output by collecting the record constructed in the fourth sub-step of Step 502.

Semi-Join

The evaluation of a semi-join operation may take advantage of further optimizations as described next.

In an example with two data tables, Supplier and Nation as illustrated in FIG. 4, and two join index tables, one on the Nation.NationKey and Supplier.NationKey, it is advantageous to evaluate the query:

```
SELECT supplier.name
FROM supplier, nation
WHERE
    supplier.acctbal > 1000
    AND nation.name == 'IRELAND'
    AND supplier.nationkey = nation.nationkey
```

Figure 6:
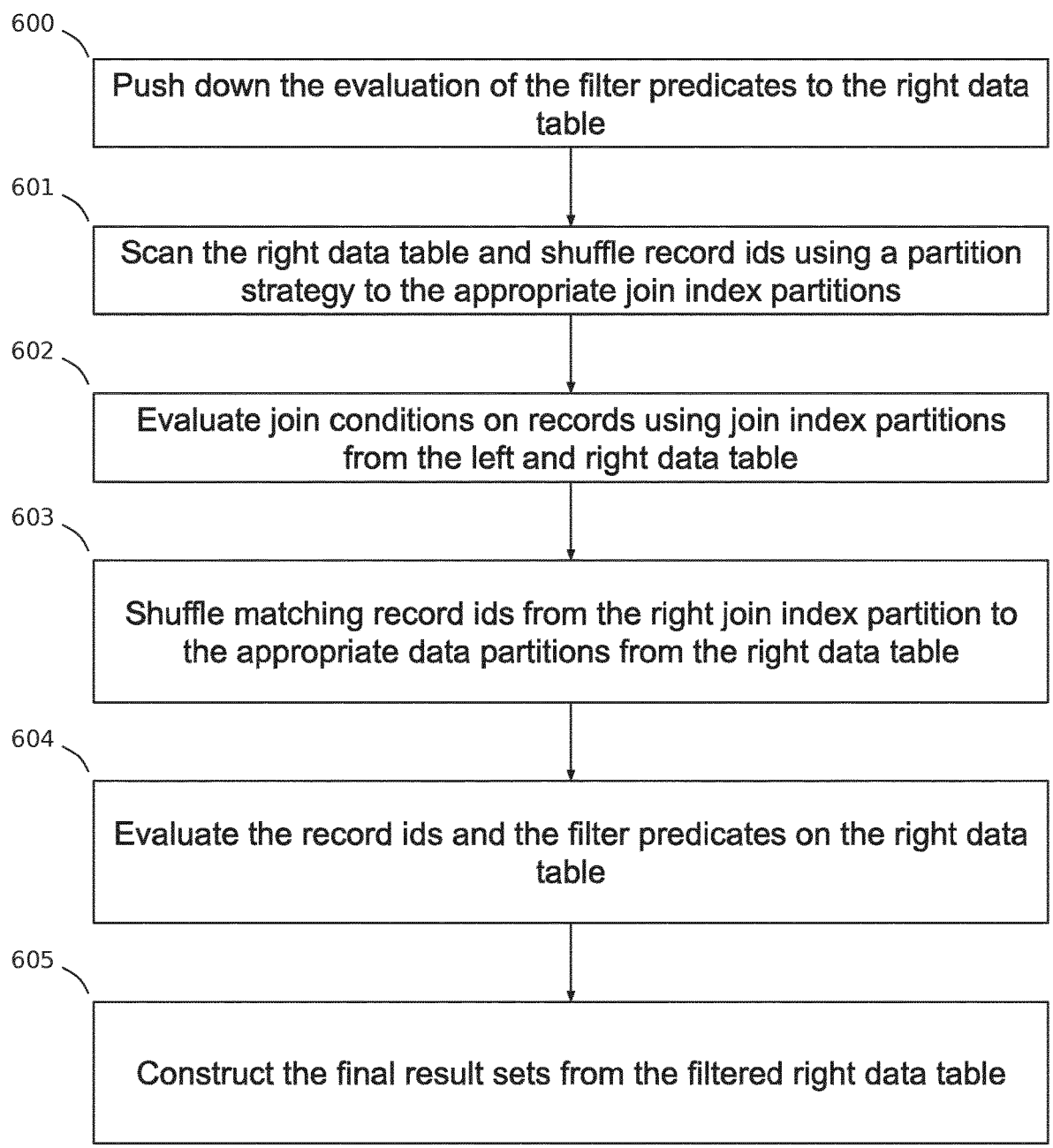
FIG. 6 illustrates a flow chart that describes method steps for computing a semi-join using a join index, according to an embodiment of the present disclosure.

FIG. 6 illustrates a flow chart that describes method steps performed by the database system for computing a semi-join, according to an embodiment of the present disclosure. Step 600 represents the database system pushing down the evaluation of the filter predicates on the Nation table. Step 601 represents the database system shuffling the record identifiers from the Nation table. Step 602 represents the database system using the join index tables Nation.NationKey and Supplier.NationKey to evaluate the join. Step 603 represents the database system shuffling the record identifiers from the join index table Supplier.NationKey to the Supplier table. Step 604 represents the database system evaluating the record identifiers and the remaining filter predicates on the Supplier table to compute the final set of matching record identifiers. Step 605 represents the database system scanning the Supplier table with the final set of matching record identifiers to construct the final result.

In Step 600, the database system pushes down the execution of the filter predicate "nation.name in ('IRELAND', 'UK', 'FRANCE')" to the Nation data table, filtering out the non-matching records.

In Step 601, the database system performs a scan of the Nation data table and of the Supplier data table to collect the records satisfying the predicate filters that were beforehand applied in Step 600. The matching records are shuffled to their appropriate join index partition based on a partition strategy. This may be performed by the database system by processing each of their data segments in the following way:
 1. For a segment with N records, allocate a join index partition array of size N, denoted by record[ ], for each join index partition. The join index partition array may be encoded as a bit array data structure.
 2. Scan the matching records in their physical order.
 3. For each matching record, compute its join index partition based on a partition strategy.
 4. Collect each matching record identifier and flip the corresponding bit into the join index partition array.
 5. Send an object <Data Partition ID, Data Segment ID, Record[ ]> to its respective join index partition. The object is composed of the data partition identifier, the data segment identifier, and the join index partition array.

Step 602 relates to the evaluation of the join operation. One simple hash-join strategy is described here but others may be possible. For each <Data Partition ID, Data Segment ID, Record[ ]> object, the associated segment from the join index partition Nation.NationKey is retrieved. A scan over the segment is performed and the relative record identifier is probed against the join index partition array record[ ], filtering out records that are not included and collecting the join key values of the remaining records in a hash table. Once all the <Data Partition ID, Data Segment ID, Record [ ]> objects have been processed and join key values collected, a scan over all the segments from the join index partition Supplier.NationKey is performed. For each record, its join key is probed against the hash table. If the join key is found, the relative record identifier is collected into a bit array data structure record[ ].

Step 603 relates to the shuffling of the record identifiers from the join index table Supplier.NationKey to the Supplier data table. This may be performed once the scan of a segment is completed. A <Data Partition ID, Data Segment ID, Record[ ]> object is sent to its corresponding Supplier data partition.

As mentioned in the previous section, if a dictionary of join key values across multiple join index partitions (in this case, Nation.NationKey and Supplier.NationKey) is built and maps each join key value to an ordinal, a very efficient join strategy may be possible. All the join key values from the Nation.NationKey column may be collected into a single bit array data structure and may be used for filtering the Supplier.NationKey column. This is more efficient as it does not require mapping the ordinal back to the original value (since the ordinals are shared between join index partitions), the hash does not have to be computed for each value at build and probe time, and the bit array data structure uses very little memory.

Step 604 relates to the computation of the list of record identifiers from the Supplier data table by filtering each data segment both with the predicate filters and the associated bit array data structure Record[ ].

Step 605 relates to the construction of the final results by fetching from the data table Supplier the records that have been identified in Step 604.

Update Strategy

There are three core operations that can modify the log structure of the database: the creation of a new segment, the deletion of a segment, and the compaction of one or more segments. In addition, a deleted record may be flagged as stale in a segment.

Figure 7:
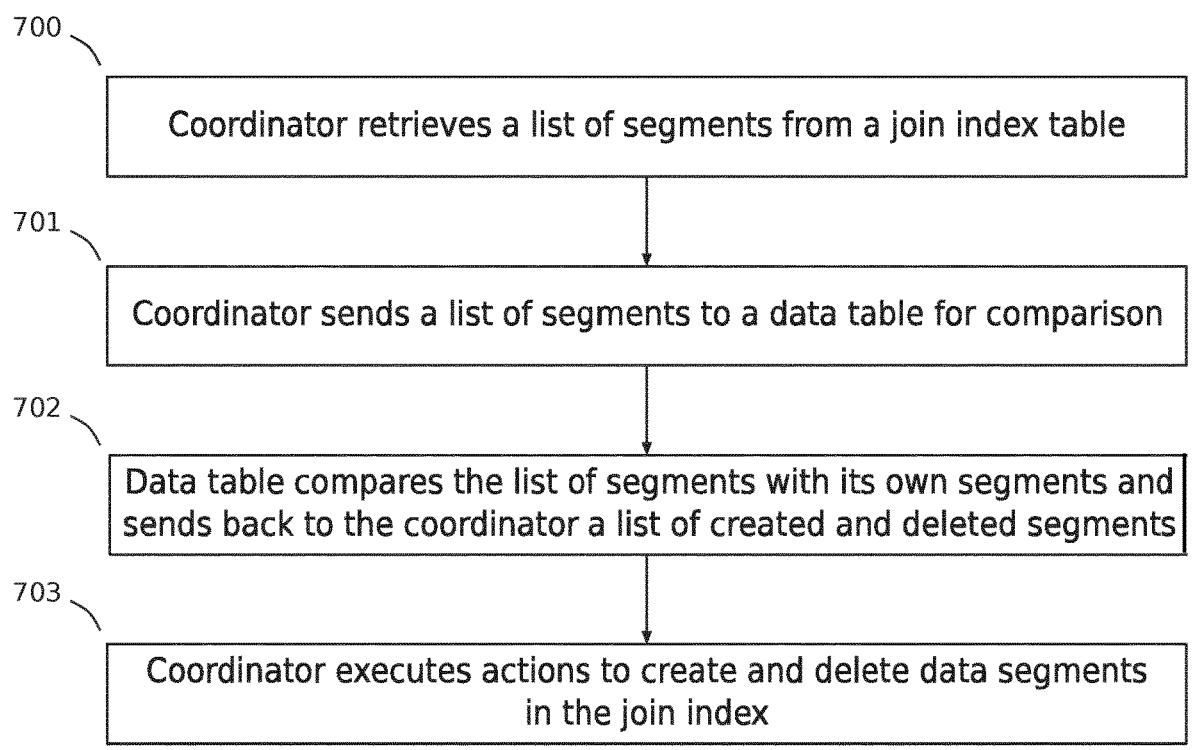
FIG. 7 illustrates a flow chart that describes method steps for updating a join index, according to an embodiment of the present disclosure.

The update of a join index table may be supervised by a coordinator service. The strategy is to compute the differences between the collection of segments stored in a join index table with the collection of segments from the data table associated to the join index table. FIG. 7 illustrates a flow chart that describes method steps for updating a join index table, according to an embodiment of the present disclosure.

Step 700 represents the coordinator retrieving the list of data segment identifiers from a join index table. This may be performed by sending a request to every join index partition of the join index table. Upon the request of the coordinator, a join index partition retrieves a collection of objects <Data Partition ID, Data Segment ID[ ]> from its data partition index and sends it back to the coordinator as response. An object <Data Partition ID, Data Segment ID[ ]> represents the list of data segment identifiers associated to a data partition identifier. The coordinator merges all the responses into one final collection of objects <Data Partition ID, Data Segment ID[ ]>.

Step 701 represents the coordinator sending a request to every data table partition of the data table associated with the join index table. This may be performed by iterating over the collection of objects <Data Partition ID, Data Segment ID [ ]>, and by sending a request for each Data Partition ID to its respective data table partition with the list of associated segment identifiers Data Segment ID[ ].

Step 702 represents the data table partition comparing its collection of data segments with the list of data segment identifiers sent by the coordinator in Step 701. Upon the request of the coordinator, the data table partition retrieves a list of all its data segment identifiers. This list is compared with the list of data segment identifiers send by the coordinator and a difference between the two lists is computed. The difference may be computed by creating a list of objects <Data Segment ID, Status> where Status is a flag indicating if the segment was either created or deleted. The data table partition sends back the list of objects <Data Segment ID, Status> to the coordinator.

In Step 703, upon the response of a data table partition, the coordinator may execute the appropriate update actions based on the list of objects <Data Segment ID, Status>. If a data segment identifier marked as deleted, the coordinator may execute an action for deleting the segment from the join index table. If a data segment identifier is marked as created, the coordinator may execute an action to replicate the data segment from the data table partition to the join index table. These actions are explained in more details next.

Creation of Segment

Figure 8:
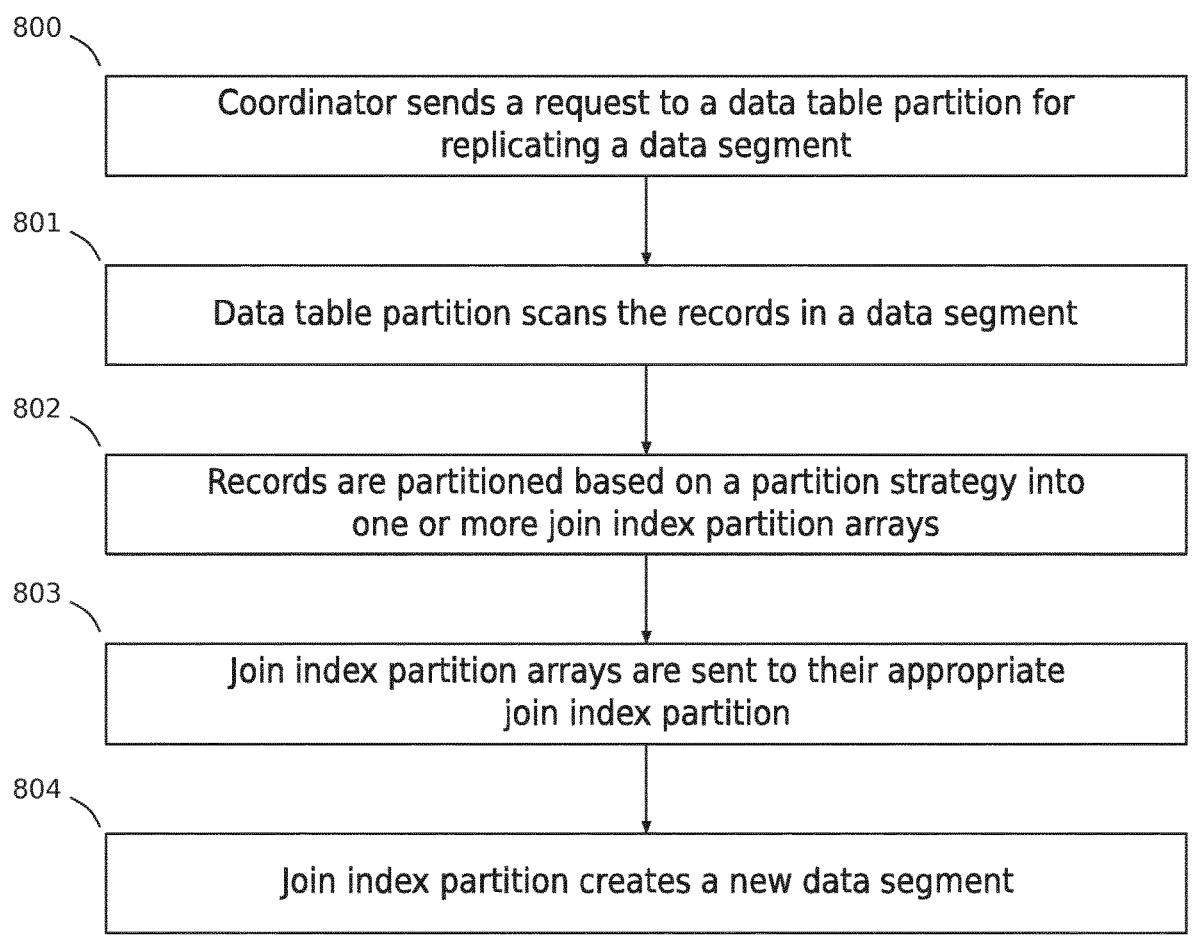
FIG. 8 illustrates a flow chart that describes method steps for replicating segments from a data table to a join index, according to an embodiment of the present disclosure.

In Step 703, when a data segment is created in a data table, the coordinator may execute an action to replicate the data segment from a data table partition to a join index table. FIG. 8 illustrates a flow chart that describes method steps for replicating a data segment from a data table to a join index table, according to an embodiment of the present disclosure.

Step 800 represents the coordinator sending a replicate request, which includes the identifier of the data segment and the join key associated to the join index table, to a data table partition that holds the referenced data segment.

In Step 801, upon receipt of the request from the coordinator, the data table partition accesses the data segment identified by the data segment identifier specified in the request and scans in their physical order the records and the appropriate columns that are needed by the join index.

In Step 802, the records are partitioned using the join key column and a partition strategy in the following way:

1. For a segment with N records, allocate a join index partition array of size N, denoted by Record[ ], for each join index partition.

2. For each record, compute its join index partition based on the join key and a partition strategy.

3. Collect each record into the appropriate join index partition array, leaving a null value for records that do not match or do not belong to the partition. The index of the array is implicitly encoding the record identifier relative to the segment.

In Step 803, the object <Data Partition ID, Data Segment ID, Record[ ]> is sent to its corresponding join index partition. The object is composed of the data partition identifier, the data segment identifier, and the join index partition array.

In an embodiment, the join index partition array may be encoded in a compact data structure to reduce memory and network transfer overhead. For example, it may be encoded in a bit array data structure if only the record identifier relative to the segment is needed.

In Step 804, once the object <Data Partition ID, Data Segment ID, Record[ ]> is transferred to the join index partition, the join index partition creates the associated data segment. At this stage, records in the data segment of the join index partition may be ordered by the join key if necessary.

Deletion of Segment

Figure 9:
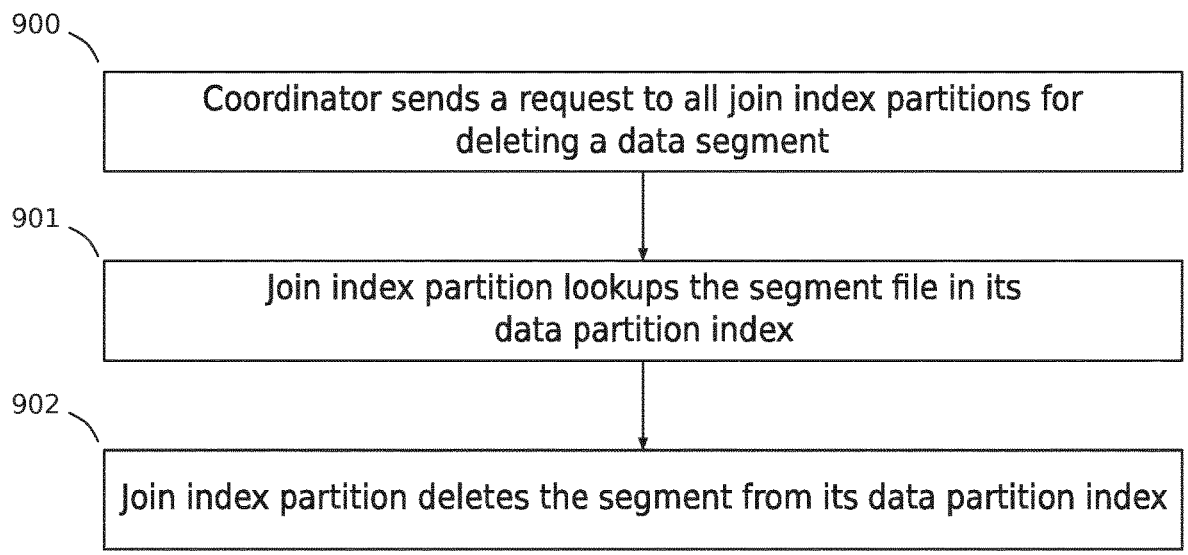
FIG. 9 illustrates a flow chart that describes method steps for deleting segments from a join index, according to an embodiment of the present disclosure.

In Step 703, when a data segment is deleted in a data table, the coordinator may execute an action to remove the data segment in the associated join index table. FIG. 9 illustrates a flow chart that describes method steps for deleting segments from a join index table, according to an embodiment of the present disclosure.

Step 900 represents the coordinator sending a delete request, which includes the data partition and data segment identifiers, to all the associated join index partitions.

In Step 901, upon receipt of the request from the coordinator, the join index partition accesses its data partition index, lookup the segment index associated to the data partition identified in the request, and finally lookup the segment file associated to the data segment associated in the request.

In Step 902, the join index partition removes the reference to the data segment from the segment index and releases the resources associated with the segment file.

Compaction

A compaction creates a new data segment from one or more data segments, then delete the old data segments. The update process is therefore a sequence of creation and deletion actions.

Record Deletion

A data segment usually stores the list of stale records in a bit array data structure. This bit array data structure may be transferred as part of the response from Step 702. For example, the response may include one or more objects <Data Segment ID, Stale Record IDs> where Stale Record IDs represents the bit array data structure encoding the IDs of the stale records.

However, one may notice that in certain scenarios, for example when the join index table is used in conjunction with the original data tables as in our previous query example, the record deletion is implicitly handled by the model. Indeed, when a list of record IDs is retrieved from a data table, the stale records may be automatically excluded from this list. When the list of record IDs is retrieved from a join index table, the list may contain IDs of stale records. However, when intersecting this list of record IDs with the data table, the stale records may be automatically filtered out.

Lazy or Eager Strategy

Figure 10:
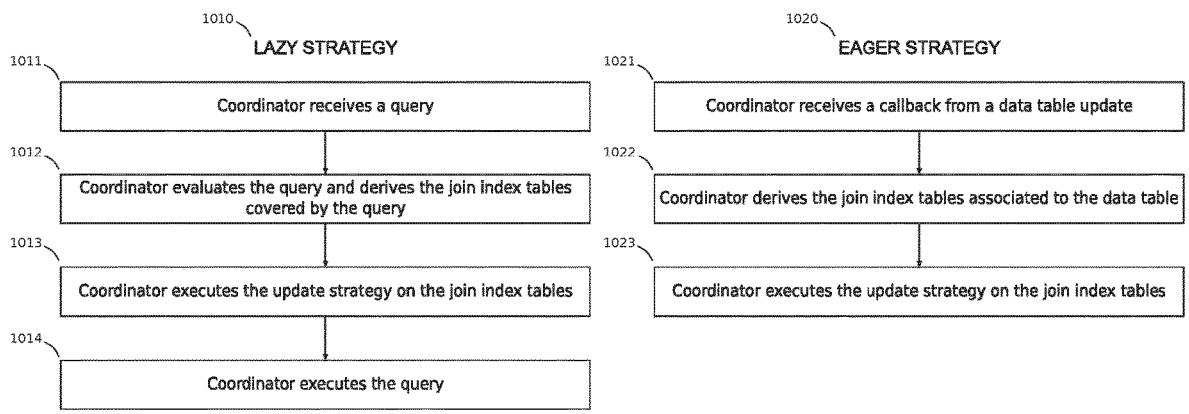
FIG. 10 illustrates a flow chart that describes a method for the lazy and eager update strategy, according to an embodiment of the present disclosure.

FIG. 10 illustrates a flow chart describing methods for two different update strategies, the "lazy" strategy and the "eager" strategy, according to an embodiment of the present disclosure. A lazy strategy 1010 is triggered when a query involving the join index table is executed, while an eager strategy 1020 is triggered when a new segment is created or deleted.

The lazy strategy 1010 may be performed in the following way. Step 1011 represents the coordinator receiving a query. In Step 1012, the coordinator evaluates the query, examines the join operations involved in the query, and derives a list of join index tables that are covered by the join operations. Step 1013 represents the coordinator executing the method steps for updating the join index table as described in FIG. 7 for each join index table that has been derived from the query. In Step 1014, once all the join index tables have been updated, the coordinator executes the query and returns the query result.

The eager strategy 1020 may be performed in the following way. It is assumed that the coordinator is registered as a listener to data table update events and receives notifications when a data segment is created, updated or deleted. Step 1021 represents the coordinator receiving a callback notifying him of a data table update event. In Step 1022, the coordinator derives the list of join index tables that are associated with the data table. In an embodiment, this may be performed by storing a reference to the data table in the metadata of a join index table, then by scanning the metadata of all the join index tables and filtering out the join index tables that do not include a reference to the data table. In another embodiment, this may be performed by having the coordinator maintaining a data structure mapping a join index table to a data table (and inversely). Step 1023 represents the coordinator executing the method steps for updating the join index table as described in FIG. 7 to for each join index table that are associated with the data table.

The lazy strategy may help reducing unnecessary load during the data indexing process, but may increase load at query time. This strategy may be useful for data tables that are updated frequently or when the join index table is not used frequently. The eager strategy may help in reducing the query latency, but may add overhead during the indexing process if an index is frequently updated.

Fault Tolerance

A join index table may be replicated to more than one node, so that if a node fails, another node can take over and serve a replica of the join index table partition. Replication may be performed using a different strategy. For example, a data table partition may send a join index partition to more than one node during the update process. An active-passive model may also be used, where a master join index table is receiving updates and is responsible for forwarding them to replicas. This has the advantages that the master may be responsible for creating and encoding new segments and may transfer the newly created segment directly to the slave, removing the segment creation and encoding overhead on the slave.

Conclusion

Figure 11:
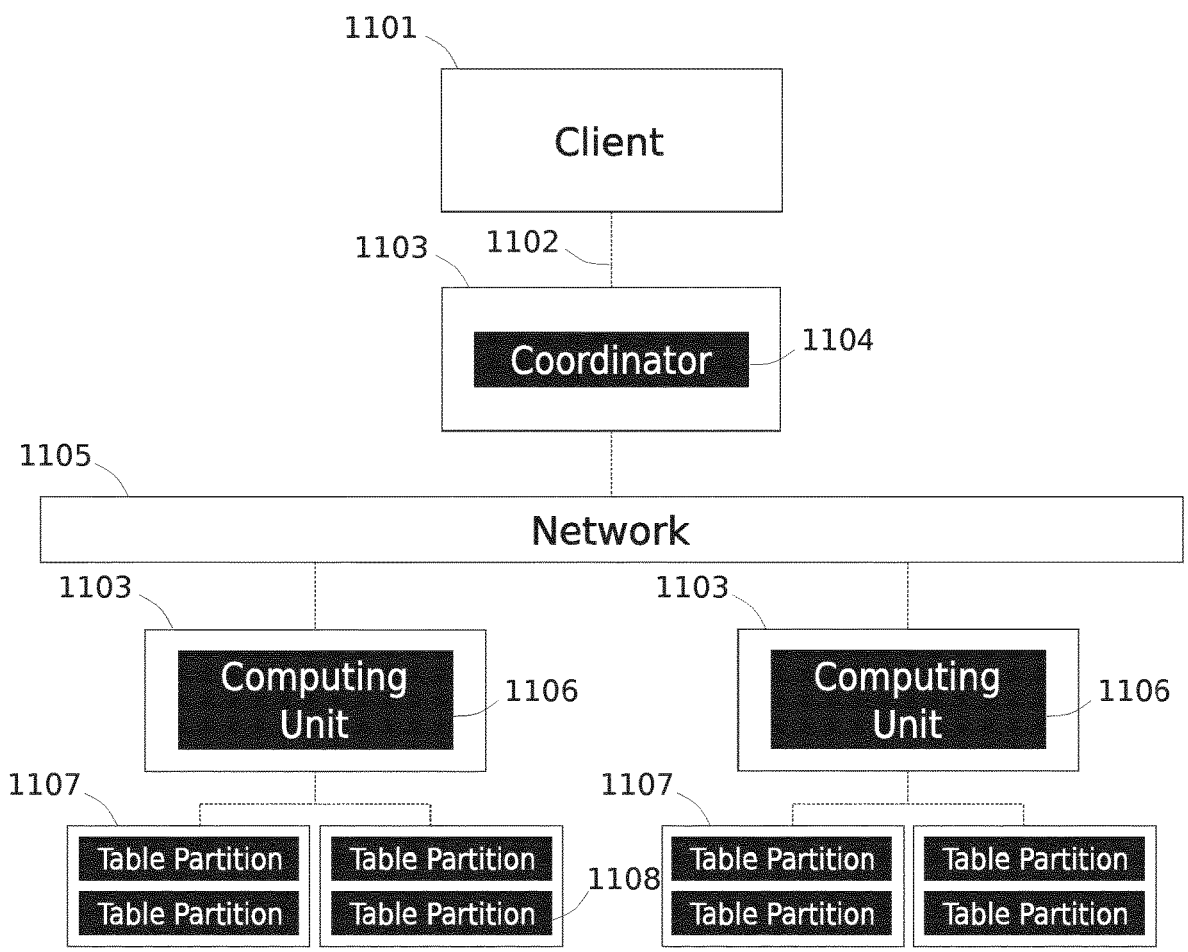
FIG. 11 illustrates an exemplary computer system, according to an embodiment of the present disclosure.

The present disclosure may be implemented as a system, a method, and/or a computer program product. FIG. 11 illustrates an exemplary computer system, according to an embodiment of the present disclosure. The computer system comprises one or more nodes 1103. A node is a database system process which includes computer-readable program instructions to carry out aspects of the present disclosure. For example, a node may include instructions to carry out the necessary functions of a coordinator 1104 or of a computing unit 1106. Nodes may be interconnected by a network 1105. One or more computer-readable storage medium 1107 may be attached to a computing unit node. One or more data or join index table partitions 1108 may be stored on a computer-readable storage medium. A computing unit node may carry out various functions such as but not limited to maintenance operations on the table partitions, scanning table partitions, transferring data to other computing unit nodes, executing join operations. A client 1101 may interact with the computer system through the coordinator node by sending a query 1102.

The computer program product may include a computer-readable storage medium (or media) having computer-readable program instructions thereon for causing a processor to carry out aspects of the present disclosure. Examples of computer-readable storage medium include, but are not limited to: magnetic media such as hard disks, floppy disks and magnetic tape; optical media such as CD-ROMs and DVDs; and hardware devices such as ROM or RAM. Examples of computer-readable program instructions include machine instructions such as produced by a compiler and higher-level instructions that are interpreted by another computer program.

Any distributed database system based on shared-nothing and log-structured (append-only) architecture, which can be for example key-value stores, document stores, graph stores or columnar data stores that perform join operations, may benefit from the present disclosure. In particular, the present disclosure can be beneficial for data analytics platforms based on such distributed database systems in domains including but not limited to business intelligence, operational intelligence, data investigation, security information and event management, log analysis, and so on. The join operations may be used, for example, to correlate records from different tables and different data sources, create views by joining multiple tables into a single table, and support relational navigation techniques such as "relational drill down" and data exploration in relational faceted systems. For example, the present disclosure may be leveraged in data investigation platforms to reduce latency and cluster load in operations such as relational navigation between dashboards, computing views by joining multiple tables, alerting on complex relational queries, correlating a large number of records into a graph representation, and so on.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described.

Similarly, the words comprises/comprising when used in the specification are used to specify the presence of stated features, integers, steps, or components but do not preclude the presence or addition of one or more additional features, integers, steps, components, or groups thereof.

The invention claimed is:

1. A method for optimizing computation and data retrieval of join operations from a multi-node log-structure database system, the database system comprising one or more data tables each having a plurality of columns, the method comprising the operations:
   creating and partitioning a join index across at least one computing node for one or more join key columns of one data table wherein each join index partition replicates the log structure storage of the data table; and
   maintaining the join index in a series of incremental operations by replicating the creation or deletion of data segments from the log structure storage of the data table to the join index partitions;
   wherein creating and partitioning the join index comprises:
      scanning and partitioning the records from one or more data table partitions into one or more join index partitions using a partition strategy;
      storing a join index partition as:
         a data partition index which maps a data partition identifier to one or more segment identifiers;
         a segment index which maps a segment identifier to one or more segment files; and
         a plurality of segment files which encode the records with relative identifiers, wherein the relative identifier for a record in a segment file of the join index is the same as the relative identifier for the corresponding record in a corresponding segment file of the data table partition from which the record originated; and
      maintaining a mapping of the data table partitions and data table segments between a data table and a join index partition containing records from said data table.

2. The method of claim 1, wherein the relative identifier for a record in a segment file is an identifier of the position of the record relative to other records in said segment file.

3. The method of claim 1, wherein creating and partitioning the join index comprises:
   maintaining a dictionary mapping the values of join key columns to ordinal values;
   sharing said dictionary across a plurality of join index partitions; and
   assigning values of join key columns to an existing ordinal value if already present in the dictionary or to a new shared ordinal value if not already present in the dictionary.

4. The method of claim 1, wherein maintaining the join index comprises:
   computing the differences between a collection of data segments in a join index and a collection of data segments in a data table;
   replicating a data segment into the join index table upon identifying from said differences a new data segment in the data table; and
   deleting a data segment from the join index upon identifying from said differences a deleted data segment in the data table.

5. The method of claim 4, wherein maintaining the join index further comprises:
   replicating into the join index a list of stale records of a data segment upon identifying said stale records from said differences.

6. The method of claim 1, further comprising computing a join operation by the steps of:
   receiving a query whose output is a join operation employing a join key column of said join index;
   identifying in the data tables a plurality of records that satisfy a portion of the query from the data tables;
   partitioning said records according to the partitioning of the join index partitions;
   transferring the partitioned records to their respective join index partitions;
   computing internal record identifiers that satisfy the join condition using the transferred records and the corresponding join index partitions; and
   constructing a result set.

7. The method of claim 6, wherein said join operation is a semi-join operation, wherein the step of constructing a result set comprises computing a final set of internal record identifiers on the data table partition using the transferred record identifiers and a remaining portion of filter predicates.

8. The method of claim 1, wherein a data segment and record identifiers within said data segment of said data table are reproduced immutably in a corresponding data segment of a join index partition.

9. The method of claim 8, wherein said method is carried out on a first data table to create a first join index with first join index partitions, and wherein said method is carried out on a second data table to create a second join index with second join index partitions.

10. The method of claim 9, further comprising joining said first and second data tables by accessing the first and second join index partitions, wherein the interoperability between the join index partitions and the corresponding data tables is preserved by the immutability of the data segments and consistency of record identifiers in a data segment across the data table and the join index partitions.

11. The method of claim 1, wherein said step of creating and partitioning a join index across at least one computing node for one or more join key columns of one data table further comprises creating and partitioning said join index for one or more secondary columns.

12. A method for optimizing computation and data retrieval of join operations from a multi-node log-structure database system, the database system comprising one or more data tables each having a plurality of columns, the method comprising the steps of:
   creating and partitioning a first join index for a first of said data tables across at least one computing node for one or more join key columns of said first data table, wherein each first join index partition reproduces the log structure storage of the first data table, and wherein a data segment and record identifiers within said data segment of the first data table are reproduced immutably in a corresponding data segment of a first join index partition;
   creating and partitioning a second join index for a second of said data tables across at least one computing node for one or more join key columns of said second data table wherein each second join index partition reproduces the log structure storage of the second data table, and wherein a data segment and record identifiers within said data segment of the second data table are reproduced immutably in a corresponding data segment of a second join index partition; and
   joining said first and second data tables by accessing the first and second join index partitions, wherein the interoperability between the join index partitions and the corresponding data tables is preserved by the immutability of the data segments and consistency of record identifiers in a data segment across the data table and the join index partitions;

wherein creating and partitioning each join index comprises:
  scanning and partitioning the records from one or more data table partitions into one or more join index partitions using a partition strategy;
  storing a join index partition as:
    a data partition index which maps a data partition identifier to one or more segment identifiers;
    a segment index which maps a segment identifier to one or more segment files; and
    a plurality of segment files which encode the records with relative identifiers, wherein the relative identifier for a record in a segment file of the join index is the same as the relative identifier for the corresponding record in a corresponding segment file of the data table partition from which the record originated; and
  maintaining a mapping of the data table partitions and data table segments between a data table and a join index partition containing records from said data table.

13. The method of claim 12, wherein the relative identifier for a record in a segment file is an identifier of the position of the record relative to other records in said segment file.

14. The method of claim 12, wherein creating and partitioning each join index comprises:
  maintaining a dictionary mapping the values of join key columns to ordinal values;
  sharing said dictionary across a plurality of join index partitions; and
  assigning values of join key columns to an existing ordinal value if already present in the dictionary or to a new shared ordinal value if not already present in the dictionary.

15. The method of claim 12, further comprising:
  maintaining the join index in a series of incremental operations by replicating the creation or deletion of data segments from the log structure storage of the data table to the join index partitions.

16. The method of claim 15, wherein maintaining each join index comprises:
  computing the differences between a collection of data segments in said join index and a collection of data segments in its corresponding data table;
  replicating a data segment into the join index table upon identifying from said differences a new data segment in the data table; and
  deleting a data segment from the join index upon identifying from said differences a deleted data segment in the data table.

17. The method of claim 16, wherein maintaining the join index further comprises:
  replicating into the join index a list of stale records of a data segment upon identifying said stale records from said differences.

18. The method of claim 12, wherein said step of creating and partitioning a first join index across at least one computing node for one or more join key columns of one data table further comprises creating and partitioning said first join index for one or more secondary columns.

19. The method of claim 12, wherein said step of creating and partitioning a second join index across at least one computing node for one or more join key columns of one data table further comprises creating and partitioning said second join index for one or more secondary columns.

20. A non-transitory storage medium comprising instructions which, when executed in a processor associated with a multi-node log-structure database system, the database system comprising one or more data tables each having a plurality of columns, are effective to cause said processor to carry out operations comprising:
  creating and partitioning a join index across at least one computing node for one or more join key columns of one data table wherein each join index partition replicates the log structure storage of the data table; and
  maintaining the join index in a series of incremental operations by replicating the creation or deletion of data segments from the log structure storage of the data table to the join index partitions;
  wherein creating and partitioning the join index comprises:
    scanning and partitioning the records from one or more data table partitions into one or more join index partitions using a partition strategy;
    storing a join index partition as:
      a data partition index which maps a data partition identifier to one or more segment identifiers;
      a segment index which maps a segment identifier to one or more segment files; and
      a plurality of segment files which encode the records with relative identifiers, wherein the relative identifier for a record in a segment file of the join index is the same as the relative identifier for the corresponding record in a corresponding segment file of the data table partition from which the record originated; and
    maintaining a mapping of the data table partitions and data table segments between a data table and a join index partition containing records from said data table.

21. The non-transitory storage medium of claim 20, wherein said operation of creating and partitioning a join index across at least one computing node for one or more join key columns of one data table further comprises creating and partitioning said join index for one or more secondary columns.

22. A non-transitory storage medium comprising instructions which, when executed in a processor associated with a multi-node log-structure database system, the database system comprising one or more data tables each having a plurality of columns, are effective to cause said processor to carry out operations comprising:
  creating and partitioning a first join index for a first of said data tables across at least one computing node for one or more join key columns of said first data table, wherein each first join index partition reproduces the log structure storage of the first data table, and wherein a data segment and record identifiers with in said data segment of the first data table are reproduced immutably in a corresponding data segment of a first join index partition;
  creating and partitioning a second join index for a second of said data tables across at least one computing node for one or more join key columns of said second data table wherein each second join index partition reproduces the log structure storage of the second data table, and wherein a data segment and record identifiers within said data segment of the second data table are reproduced immutably in a corresponding data segment of a second join index partition; and joining said first and second data tables by accessing the first and second join index partitions, wherein the interoperability between the join index partitions and the corresponding data tables is preserved by the immutability of the data segments and consistency of record identifiers in a data segment across the data table and the join index partitions;

wherein creating and partitioning each join index comprises:

scanning and partitioning the records from one or more data table partitions into one or more join index partitions using a partition strategy;

storing a join index partition as:

a data partition index which maps a data partition identifier to one or more segment identifiers;

a segment index which maps a segment identifier to one or more segment files; and a plurality of segment files which encode the records with relative identifiers, wherein the relative identifier for a record in a segment file of the join index is the same as the relative identifier for the corresponding record in a corresponding segment file of the data table partition from which the record originated; and maintaining a mapping of the data table partitions and data table segments between a data table and a join index partition containing records from said data table.

23. The non-transitory storage medium of claim 22, wherein said operation of creating and partitioning a first join index across at least one computing node for one or more join key columns of one data table further comprises creating and partitioning said first join index for one or more secondary columns.

24. The non-transitory storage medium of claim 22, wherein said operation of creating and partitioning a second join index across at least one computing node for one or more join key columns of one data table further comprises creating and partitioning said second join index for one or more secondary columns.

* * * * *